United States Patent
Nabeshima

(10) Patent No.: US 7,348,994 B2
(45) Date of Patent: Mar. 25, 2008

(54) COLOR CONVERSION APPARATUS AND METHOD WITH PRECISION ENHANCEMENT IN COLOR CONVERSION

(75) Inventor: Takayuki Nabeshima, Osaka (JP)

(73) Assignee: Minolta Co., Ltd., Osaka-shi (JP)

( * ) Notice: Subject to any disclaimer, the term of this patent is extended or adjusted under 35 U.S.C. 154(b) by 935 days.

(21) Appl. No.: 09/799,489

(22) Filed: Mar. 7, 2001

(65) Prior Publication Data

US 2001/0033288 A1    Oct. 25, 2001

(30) Foreign Application Priority Data

Mar. 9, 2000    (JP)    ............................. 2000-065359

(51) Int. Cl.
G09G 5/06    (2006.01)
(52) U.S. Cl. ...................... 345/601; 345/589
(58) Field of Classification Search ................ 345/600, 345/604, 605, 601, 589
See application file for complete search history.

(56) References Cited

U.S. PATENT DOCUMENTS

| | | | | |
|---|---|---|---|---|
| 5,321,797 A | * | 6/1994 | Morton | 345/604 |
| 5,611,030 A | * | 3/1997 | Stokes | 345/590 |
| 6,115,031 A | * | 9/2000 | Love et al. | 345/603 |
| 6,191,772 B1 | * | 2/2001 | Mical et al. | 345/698 |
| 6,246,396 B1 | * | 6/2001 | Gibson et al. | 345/604 |
| 6,323,969 B1 | | 11/2001 | Shimizu et al. | |
| 6,335,734 B1 | * | 1/2002 | Nagae et al. | 345/589 |
| 6,414,690 B1 | * | 7/2002 | Balasubramanian et al. | 345/589 |

FOREIGN PATENT DOCUMENTS

| | | |
|---|---|---|
| JP | 07095423 A | 4/1995 |
| JP | 07184073 A | 7/1995 |
| JP | 8-98042 | 4/1996 |
| JP | 10-200772 | 7/1998 |
| JP | 10-276337 | 10/1998 |
| JP | 11-055536 A | 2/1999 |

OTHER PUBLICATIONS

English Translation of Office Action mailed Sep. 26, 2006 directed to Japanese Patent Application No. 2000-065359 (3 pages).

* cited by examiner

Primary Examiner—Kee M. Tung
Assistant Examiner—Javid A Amini
(74) Attorney, Agent, or Firm—Morrison & Foerster LLP

(57) ABSTRACT

A method of converting image data from L*a*b* color space into CMYK color space by using a three-dimensional direct mapping table employs only data of lattice points existing within the color space. 8-point interpolation is used when all the lattice points constituting a lattice component containing input data are included in the color space, while another interpolation processing (e.g. 4-point interpolation) is employed for a lattice component partially existing outside the color space by using only lattice point data within the color space. Enhancement of precision in color conversion is thus achieved.

13 Claims, 13 Drawing Sheets

F I G. 2
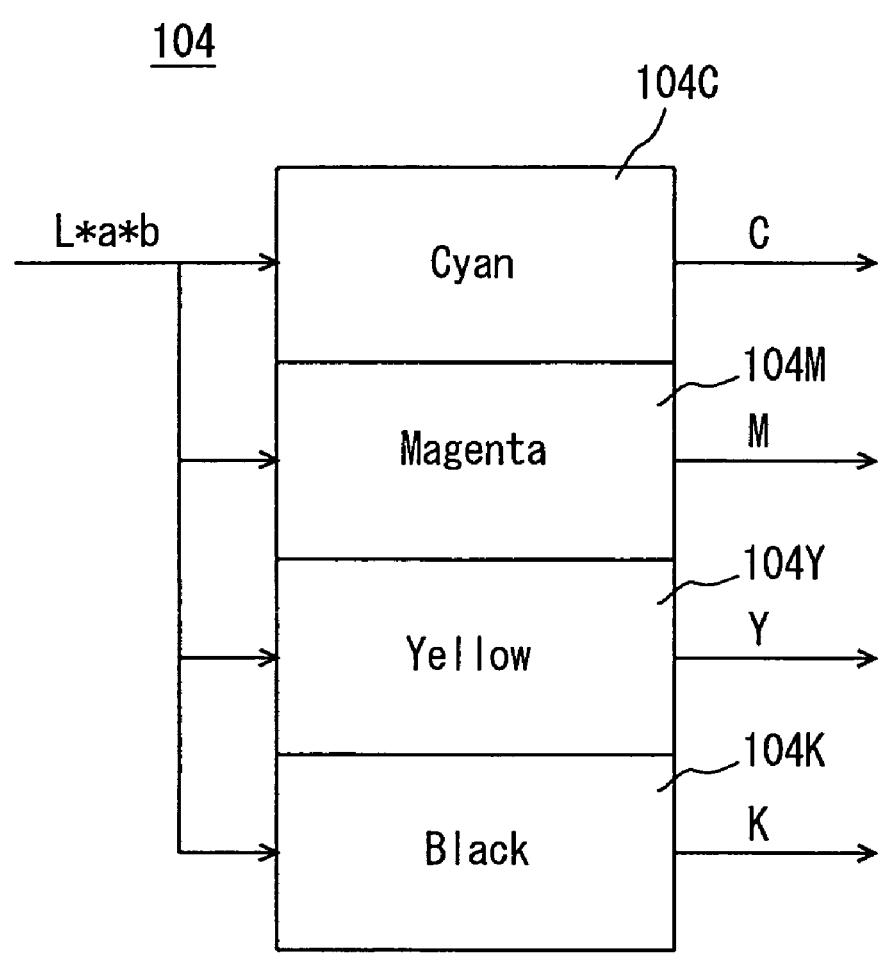

<8-POINT INTERPOLATION PROCESSING>

<4-POINT INTERPOLATION PROCESSING>

NUMBER OF CUBES: 8 × 8 × 8 = 512
NUMBER OF LATTICE POINTS: 9 × 9 × 9 = 729

F I G. 1 2  PRIOR ART
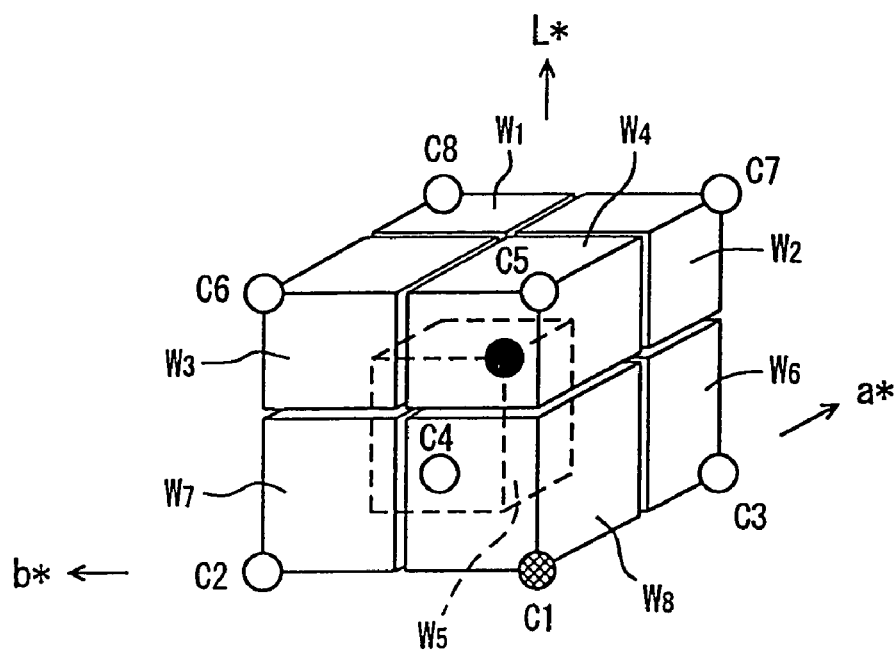
F I G. 1 3  PRIOR ART
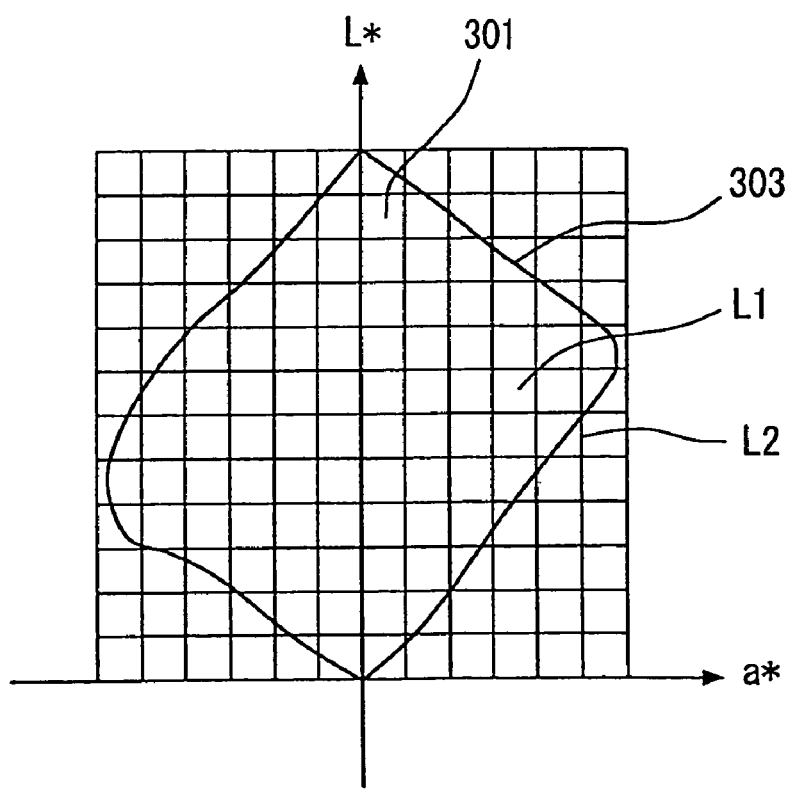

COLOR CONVERSION APPARATUS AND METHOD WITH PRECISION ENHANCEMENT IN COLOR CONVERSION

This application is based on application No. 2000-65359 filed in Japan, the content of which is hereby incorporated by reference.

BACKGROUND OF THE INVENTION

1. Field of the Invention

The present invention relates to an apparatus and a method for color conversion. In particular, the invention relates to a color conversion apparatus and a color conversion method for performing color conversion by means of direct mapping method using a three-dimensional look-up table.

2. Description of the Related Art

Direct mapping and masking methods have been known as means for converting input image data represented by some color space into an output image data represented by a different color space. The direct mapping method uses a three-dimensional look-up table (hereinafter abbreviated as "LUT") associating color space data of input image data with that of output image data and storing the correspondence to directly convert data.

If all of the output image data with respect to the input image data are stored in the three-dimensional LUT, an enormous memory capacity is required. Then, the LUT is usually employed together with interpolation processing in order to accomplish color conversion. Specifically, an LUT is created with a minimum number of data (number of lattice points) and data located between the lattice points are determined through interpolation processing.

FIG. 10 is a schematic block diagram illustrating color conversion through such a direct mapping method. Here, input image data is data of L*, a* and b* represented in an L*a*b* color space. L* data, a* data and b* data are each formed of 8 bits. Output image data is data of C, M, Y and K represented in a CMYK color space. C data, M data, Y data and K data are each formed of 8 bits.

As color conversion processes for respective four components (CMYK) of output image data are similar, description herein of the color conversion is applied only to one component (C component) among these four components (CMYK).

Referring to FIG. 10, color conversion by means of the direct mapping method includes a process of extracting eight lattice points by a three-dimensional LUT unit 701 to output data corresponding to the extracted lattice points and a process of calculating desired interpolation data between the lattice points by an 8-point interpolation processing unit 703. Three most significant bits of 8 bits of L*a*b* input image data each are input to three-dimensional LUT unit 701 and five least significant bits thereof are input to 8-point interpolation processing unit 703.

Three-dimensional LUT unit 701 includes a three-dimensional LUT recording a correspondence between L*a*b* color space data and CMYK color space data. FIG. 11 illustrates this three-dimensional LUT. Referring to FIG. 11, the three-dimensional LUT has respective axes of L*a*b* each divided into 8 sections of 32 steps each and thus lattice points are defined. Output image data is related to input image data corresponding to a lattice point and the output image data (lattice point data) is stored in the LUT.

Three-most-significant-bit data of L*a*b* data is supplied to three-dimensional LUT unit 701 which then extracts eight lattice points in the three-dimensional LUT. These eight lattice points constitute a minimum cube in L*a*b* color space, the cube being determined by the three-most-significant-bit data. The three-dimensional LUT is referred to extract output data corresponding to each lattice point.

8-point interpolation processing unit 703 receives five least significant bits of L*a*b* data each to calculate a weighting factor from the five-least-significant-bit data. Then, the calculated weighting factor and output data (lattice point data) corresponding to the eight lattice points extracted by three-dimensional LUT unit 701 are used to determine final output data Cout in accordance with the formula below.

$$Cout = \sum_{i=1}^{8} Wi \cdot Ci$$

$$Wi = \frac{Vi}{a^3}$$

Where Wi represents a weighting factor calculated from the five-least-significant-bit data and Ci represents lattice point data. As shown in FIG. 12, weighting factor Wi indicates the contribution ratio of each of lattice point data (C1–C8) corresponding to respective eight points to output data of one point (black dot locating almost at the center of the cube).

This conventional color conversion process, however, has a problem of a low precision in color conversion.

The reason for the poor precision in color conversion of the conventional method is described below in conjunction with FIG. 13.

Referring to FIG. 13, L*a*b* color space is in the shape of a spindle with L* axis as the central axis. The outermost boundary of L*a*b* color space is indicated by reference numeral 303. If input data (to be processed) is located within a unit L1 of the lattice (a unit of the lattice is hereinafter referred to as lattice component), all of the eight lattice points constituting the lattice component accordingly exist in L*a*b* color space. A highly precise interpolation processing is thus possible.

On the other hand, if input data is located in a lattice component L2, the lattice points thereof are partially located out of L*a*b* color space. Use of data of the lattice points on the outside of L*a*b* color space for interpolation processing deteriorates precision in color conversion. The reason is that determination of the data of lattice points existing outside the color space requires prediction from data of lattice points within the color space, and resultant data is thus inferior in accuracy.

In order to overcome such a problem, a method has been devised as shown in FIG. 14 according to which L*a*b* color space is more finely divided near the outermost boundary (see for example Japanese Patent Laying-Open No. 10-276337).

This method, however, requires interpolation processing using lattice points on the outside of the color space as shown in FIGS. 15–17, resulting in a poor precision in color conversion.

SUMMARY OF THE INVENTION

One object of the present invention, having been made to solve the problem above, is to provide a color conversion apparatus and a color conversion method to accomplish an enhanced precision in color conversion.

According to one aspect of the invention for achieving the object, a color conversion apparatus includes a color conversion table for receiving input image data represented by a first color space to output color-converted data represented by a second color space, the color-converted data corresponding to lattice points of a lattice component containing the input image data in the first color space, an interpolation processing unit for performing interpolation processing using the color-converted data output from the color conversion table, and a switching unit for changing lattice points corresponding to the color-converted data to be used by the interpolation processing unit, according to position of the input image data in the first color space.

According to another aspect of the invention, a color conversion method includes the steps of receiving input image data represented by a first color space to output color-converted data represented by a second color space, the color-converted data corresponding to lattice points of a lattice component containing the input image data in the first color space, performing interpolation processing using the output color-converted data, and changing lattice points corresponding to the color-converted data to be used in the interpolation processing, according to position of the input image data in the first color space.

According to still another aspect of the invention, a color conversion apparatus includes a color conversion table for receiving input image data represented by a first color space to output color-converted data represented by a second color space, the color-converted data corresponding to lattice points of a lattice component containing the input image data in the first color space, a first interpolation processing unit for performing interpolation processing using color-converted data output from the color conversion table, a second interpolation processing unit for performing interpolation processing using color-converted data corresponding to lattice points different from those used by the first interpolation processing unit, and a switching unit for making a switch between the first interpolation processing unit and the second interpolation processing unit, according to position of the input image data in the first color space.

According to a further aspect of the invention, a color conversion apparatus includes a color conversion table for receiving input image data represented by a first color space to output color-converted data represented by a second color space, the color-converted data corresponding to lattice points of a lattice component containing the input image data in the first color space, a storage unit for storing distance information indicating distance between the lattice points, an interpolation processing unit for performing interpolation processing using the color-converted data output from the color conversion table and the distance information stored in the storage unit.

According to a still further aspect of the invention, a color conversion method includes the steps of receiving input image data represented by a first color space to output color-converted data represented by a second color space, the color-converted data corresponding to lattice points of a lattice component containing the input image data in the first color space, and performing interpolation processing using the output color-converted data and distance information indicating distance between the lattice points.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 2 is a block diagram showing a structure of a color converting unit 104 in FIG. 1.

FIG. 12 illustrates weighting factor used for 8-point interpolation.

FIG. 13 illustrates a problem in a conventional method.

DESCRIPTION OF THE PREFERRED EMBODIMENTS

First Embodiment

Figure 1:
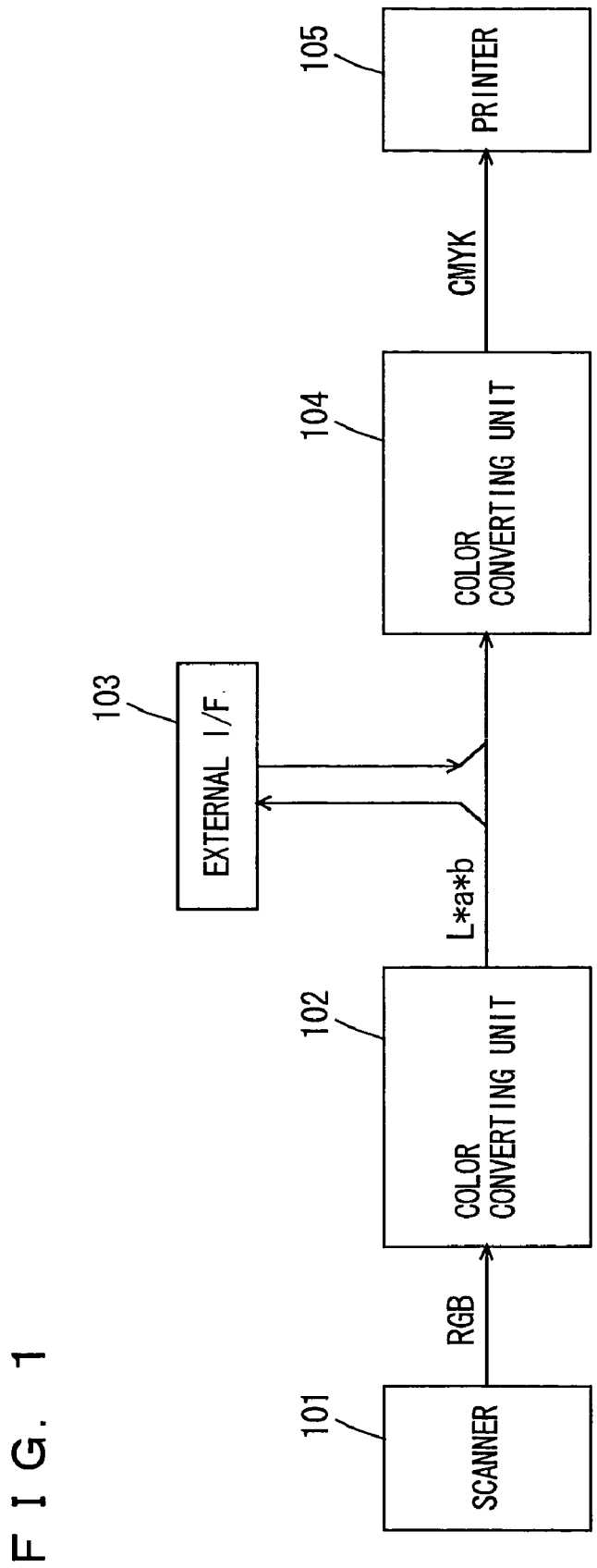
FIG. 1 shows an entire structure of an image processing apparatus according to a first embodiment of the present invention.

Embodiments of the present invention are now described in conjunction with the drawings. FIG. 1 shows an entire structure of an image processing apparatus according to a first embodiment of the invention.

Referring to FIG. 1, the image processing apparatus (including a color conversion apparatus) includes a scanner 101 reading an image, a color converting unit 102 converting data in RGB color space supplied from scanner 101 into data in L*a*b* color space, an external interface (I/F) 103 communicating the L*a*b* color space data with an external device, a color converting unit 104 converting image data in L*a*b* color space into image data in CMYK color space, and a printer 105 making a print based on the data of CMYK color space.

An RGB signal of image data provided from an input device like scanner 101 is converted into a L*a*b* signal in a standard color space by color converting unit 102. The L*a*b* data generated by this conversion is output to a personal computer or the like via external I/F 103 as required. The L*a*b* data is also converted by color converting unit 104 into CMYK data that matches color reproduction characteristics of the printer and then supplied to printer 105.

A CPU or timing generator (not shown) is used for setting of parameters of data supplied to each of these blocks, switching of buses, input of timing signals, and the like.

Color converting unit 104 functions as a converting circuit making a table conversion by means of a three dimensional LUT. Similar circuits are employed for respective colors of CMYK. L*a*b* data is accordingly converted by a table data defined for each color of CMYK and then output.

Color converting unit 102 employs a matrix operation, an LUT (look-up table) or the like with a predetermined factor to implement conversion (details are not shown here).

FIG. 2 is a functional block diagram showing a schematic structure of color converting unit 104 in FIG. 1. Referring to FIG. 2, color converting unit 104 includes four direct mapping units 104C, 104M, 104Y and 104K. These mapping units are used to generate output data of C, M, Y and K each from input data of L*a*b* produced by color converting unit 102. These four direct mapping units have the same structure, therefore, only the structure for the C component is herein illustrated below.

Figure 3:
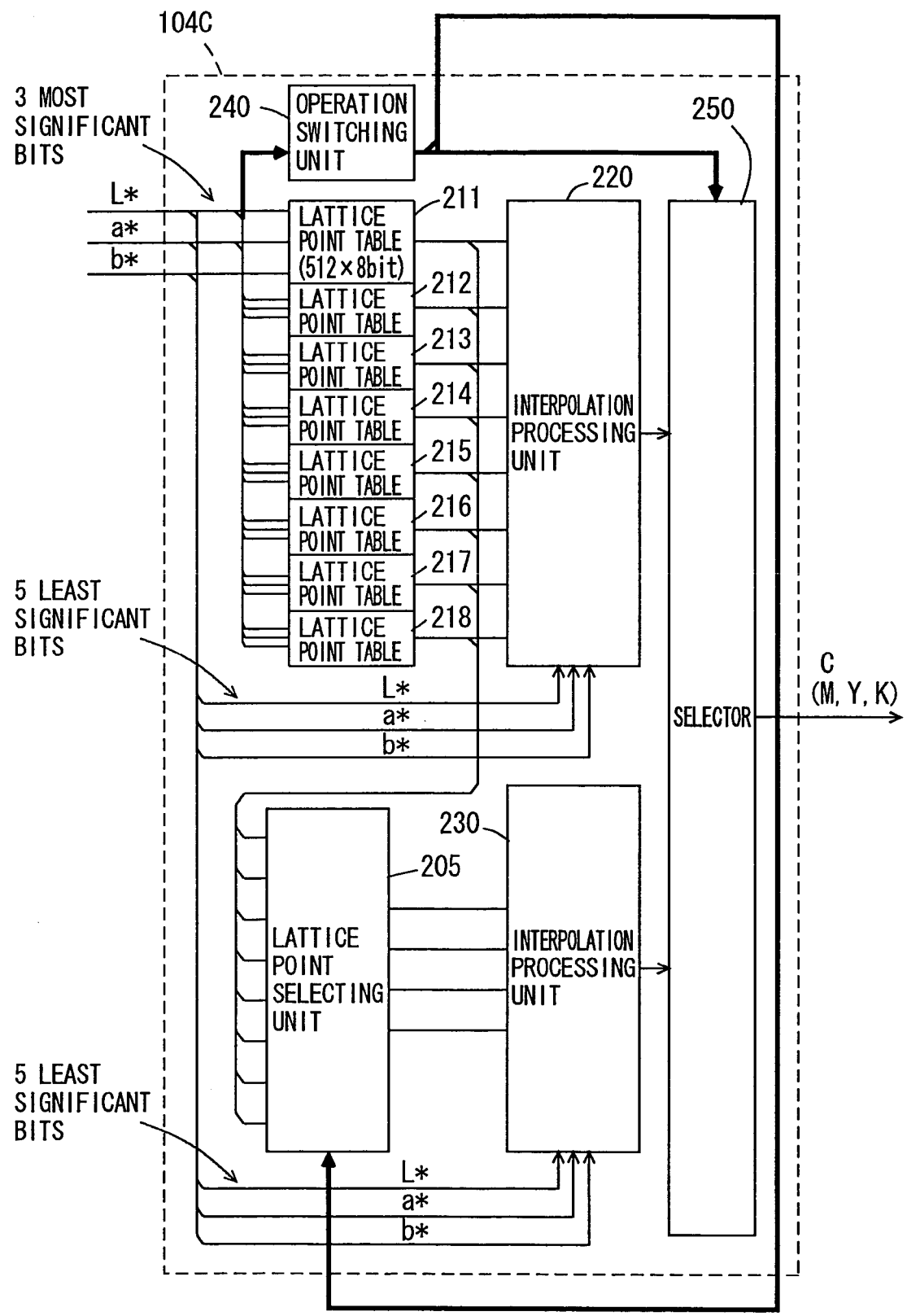
FIG. 3 is a block diagram showing a structure of a direct mapping unit 104C in FIG. 2.

FIG. 3 is a block diagram showing an internal structure of direct mapping unit 104C in FIG. 2. Referring to FIG. 3, direct mapping unit 104C includes lattice point tables 211–218 receiving three most significant bits of L*a*b* data each to output C data at respective eight lattice points constituting a lattice component including the received L*a*b* data, an interpolation processing unit 220 using the data from lattice point tables 211–218 and five least significant bits of the L*a*b* data each to perform interpolation processing, a lattice point selecting unit 205 selecting from the data supplied from lattice point tables 211–218 four lattice points to be used for interpolation processing, an interpolation processing unit 230 using data of the selected four lattice points and five least significant bits of the L*a*b* data each to perform interpolation processing, an operation switching table 240 according to the three-most-significant-bit of the L*a*b* data to make a change between 8-point interpolation and 4-point interpolation, and a selector 250 according to a signal from operation switching table 240 to select one of data from interpolation processing unit 220 and data from interpolation processing unit 230 and output the selected one of them.

Interpolation processing unit 220 performs interpolation processing using data of all lattice points (eight lattice points) composing a lattice component including L*a*b* data (8-point interpolation). On the other hand, interpolation processing unit 230 performs interpolation processing using data of only four lattice points among the eight lattice points composing the lattice component including L*a*b* data (4-point interpolation).

Three-most-significant-bit data of input image data L*a*b* is supplied to lattice point tables 211–218. A cube (lattice component) in L*a*b* color space is selected, the cube containing the input image data, and accordingly data of eight lattice points of the cube is output. The data of eight lattice points is input to interpolation processing unit 220 and to lattice point selecting unit 205. Five-least-significant-bit data of the L*a*b* is used to calculate output data corresponding to the input image data, through interpolation processing using three-dimensional positions in the cube (lattice component).

Figure 4:
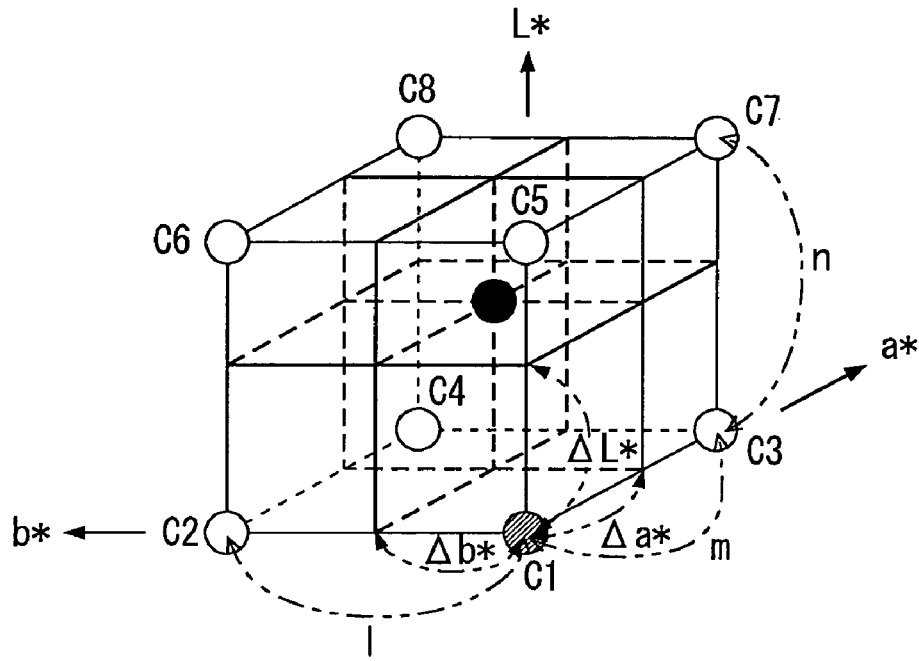
FIG. 4 illustrates 8-point interpolation.

FIG. 4 illustrates the 8-point interpolation method employed by interpolation processing unit 220. It is assumed here that input image data represented by ● in the drawing is present in a lattice component constituted of lattice points C1–C8. With lattice point C1 as an origin, the position of the input image data with respect to L* direction is represented by $\Delta L^*$, the position in a* direction by $\Delta a^*$, and the position in b* direction by $\Delta b^*$. Further, the dimension of one lattice component in L* direction is indicated by n, the dimension in a* direction is indicated by m and the dimension in b* direction is indicated by l. If one lattice component is a cube, the relation l=m=n is satisfied. Representing output data of lattice points C1–C8 as C1–C8 respectively, formula (1) below provides a result of 8-point interpolation.

● output=$\{C1 \cdot (n-\Delta L^*) \cdot (m-\Delta a^*) \cdot (l-\Delta b^*)+$
$C2 \cdot (n-\Delta L^*) \cdot (m-\Delta a^*) \cdot \Delta b^*+$
$C3 \cdot (n-\Delta L^*) \cdot \Delta a^* \cdot (l-\Delta b^*)+$
$C4 \cdot (n-\Delta L^*) \cdot \Delta a^* \cdot \Delta b^*+$
$C5 \cdot \Delta L^* \cdot (m-\Delta a^*) \cdot (l-\Delta b^*)+$
$C6 \cdot \Delta L^* \cdot (m-\Delta a^*) \cdot \Delta b^*+$
$C7 \cdot \Delta L^* \cdot \Delta a^* \cdot (l-b^*)+$
$C8 \Delta L^* \cdot \Delta a^* \cdot \Delta b^*\}/(n \cdot m \cdot l)$ (1)

Figure 5:
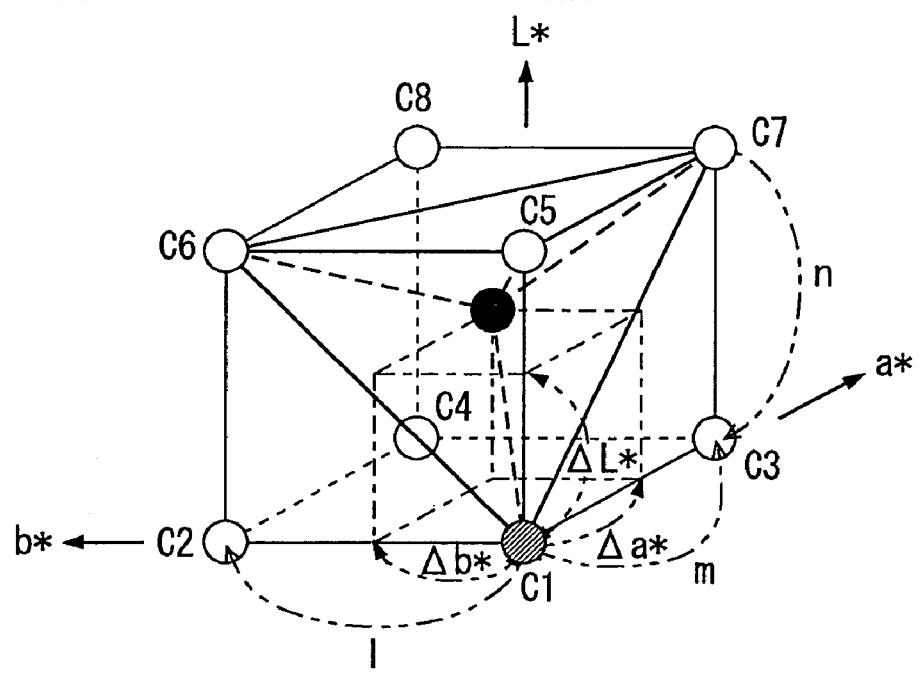
FIG. 5 illustrates 4-point interpolation.

FIG. 5 illustrates the 4-point interpolation method employed by interpolation processing unit 230.

It is assumed that input image data is present in a cube represented by C1–C8 and interpolation processing is performed using data of four lattice points, C1, C5, C6 and C7 for example. At this time, image data is calculated through the 4-point interpolation based on C1, C5, C6 and C7 as shown by formula (2) below.

● output=$[C1 \cdot [\{(l \cdot m)/2\} \cdot (n-\Delta L^*)]/3+$
$C6 \cdot [\{(n \cdot m)/2\} \cdot \Delta b^*]/3+$
$C7 \cdot (\{(l \cdot n)/2\} \cdot \Delta a^*]/3+$
$C5 \cdot [\sqrt{(l^2+n^2)} \cdot \sqrt{(n^2+m^2)}-$
$(\sqrt{(l^2+n^2)})/2) \cdot \sqrt{(l^2+}$
$m^2 \Delta L^{*2})]]/(((l \cdot m)/2 \cdot n)/3)$ (2)

Figure 6:
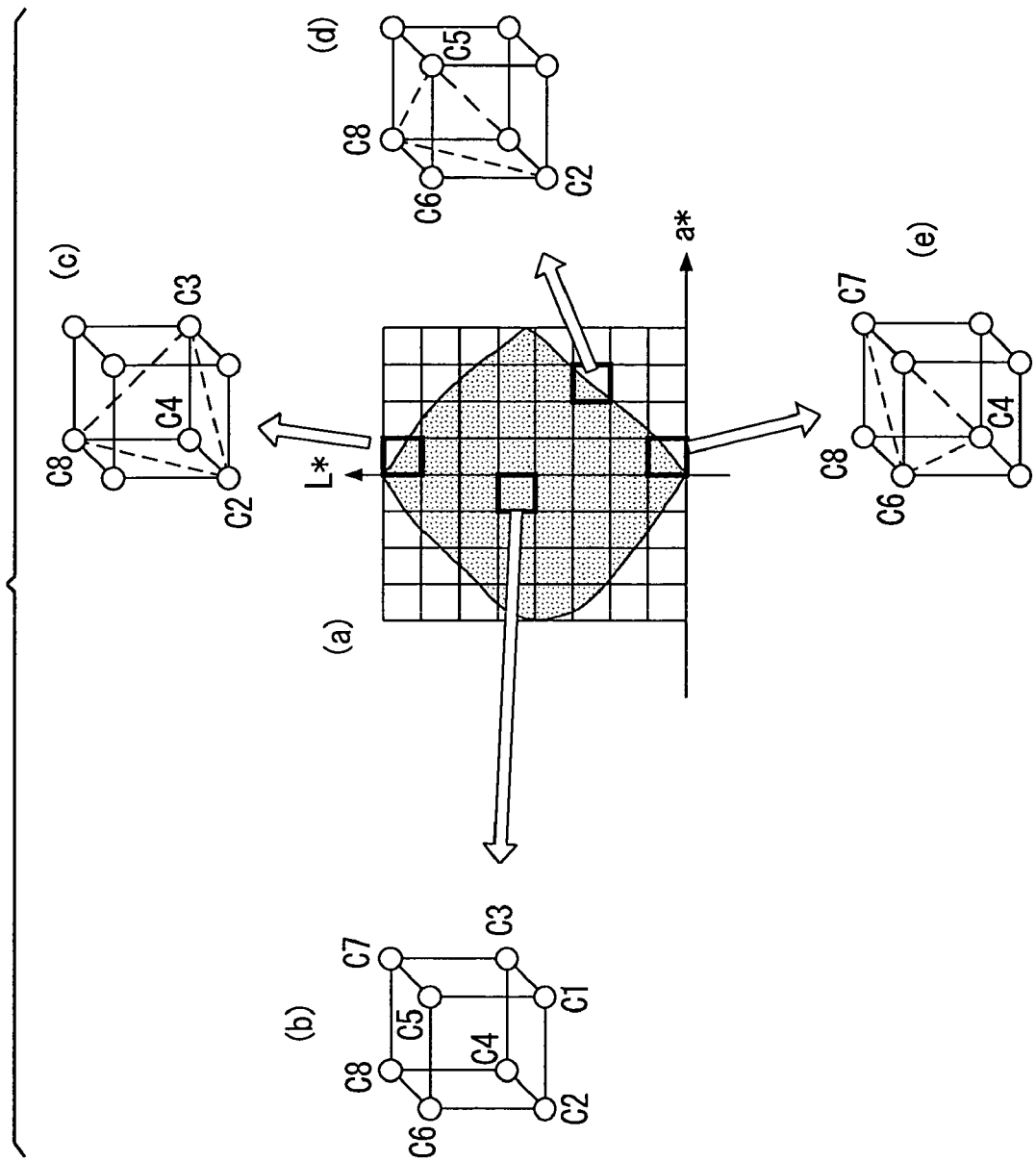
FIG. 6 illustrates processing according to the first embodiment.

FIG. 6 illustrates switching between 8-point interpolation and 4-point interpolation. In FIG. 6, (a) shows L*a* cross section in two-dimensional manner included in three-dimensional L*a*b* space. As shown, the space extends into the high-chroma region where luminosity L has values at and around the intermediate value. However, the space extends into the low-chroma region only where the luminosity is low and high.

For example, if eight points of a lattice component including input data are all in L*a*b* space, data of all the eight points C1–C8 are used to do eight-point interpolation as shown by (b). For a region of high-luminosity as shown by (c), the color space is in the shape of a pyramid. At this position, 4-point interpolation is performed using only the lattice points C2–C4 and C8 included in the color space. The lattice points used for this interpolation processing are selected by lattice point selecting unit 205.

For a region of the color space around an intermediate luminosity and near high-chroma as shown by (d), the boundary of the color space appears to form a part of a spherical surface. At this position, lattice points C2, C5, C6 and C8 included in the color space are selected and used to perform 4-point interpolation.

Similarly, for a region of the color space as represented by (e), lattice points C4, C6, C7 and C8 are used to implement 4-point interpolation. In this way, according to this embodiment, 8-point interpolation is employed when all the 8 points constituting a lattice component containing input data are present in the color space. Otherwise, 4-point interpolation is performed using only data of lattice points in the color space. Accordingly, interpolation processing is accomplished using only the data of lattice points included in the color space, and a resultant color conversion is thus highly precise.

Although this embodiment employs switching between 8-point interpolation and 4-point interpolation, other interpolation methods such as 5-point, 6-point, 7-point interpolation methods and the like may be employed instead of the 4-point interpolation.

Modification

Figure 7:
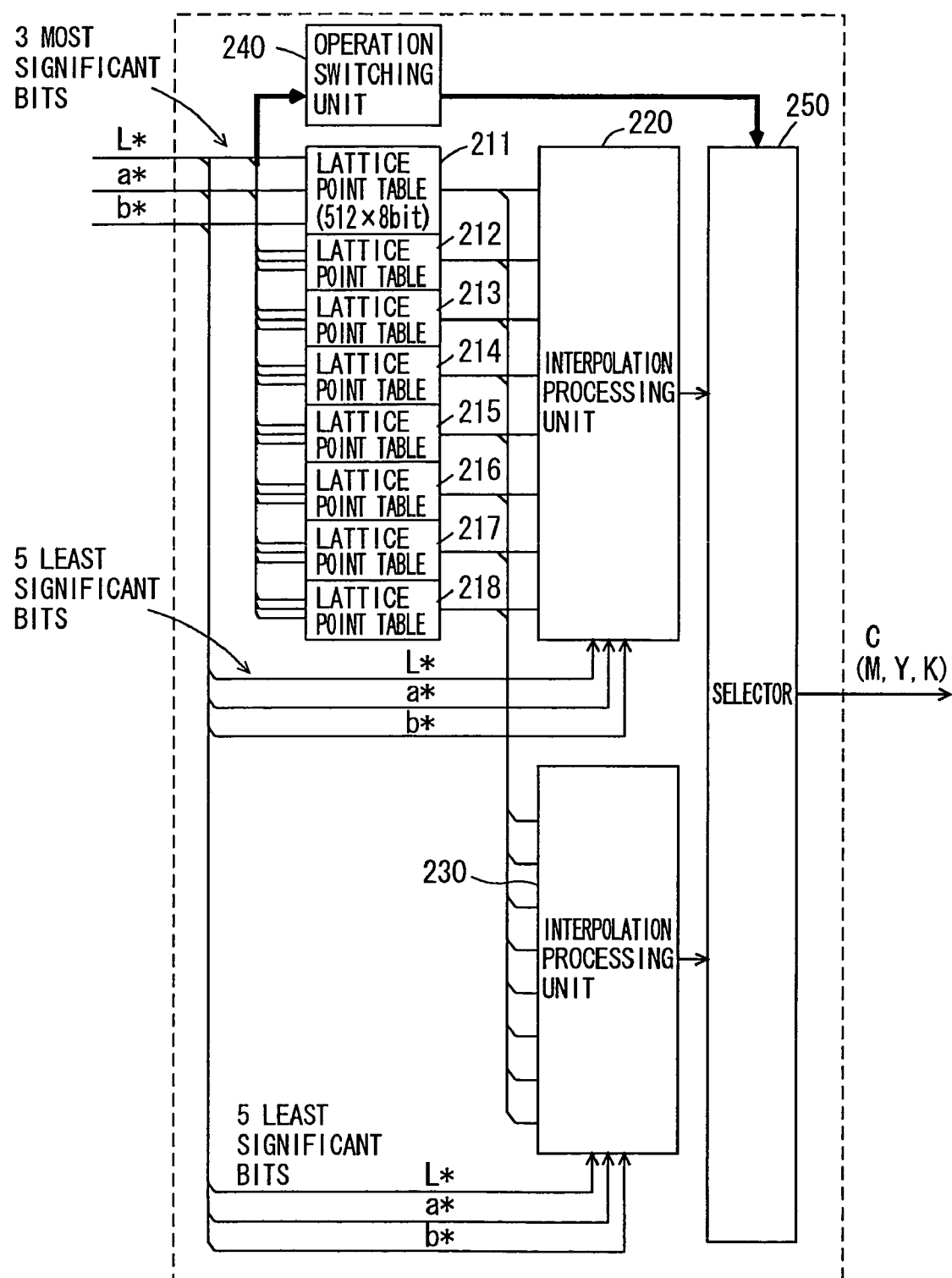
FIG. 7 is a block diagram showing a modification of the first embodiment.

FIG. 7 is a block diagram showing a modification of direct mapping unit 104C in FIG. 3. According to this modification, data output from lattice point tables 211–218 are supplied to both of an interpolation processing unit 220 and an interpolation processing unit 230 where different interpolation processes are performed in respective processing units. A selector 250 then selects and outputs one of respective results. Selector 250 makes this selection following a signal supplied from an operation switching table 240.

Operation switching table 240 uses three most significant bits of L*a*b* data to determine the position, in the color space, of the input data. Based on this determination, switching table 240 transmits a signal to selector 250. For example, interpolation processing units 220 and 230 respectively use different lattice points for interpolation processing and then selector 250 selects one of respective outputs. Interpolation processing is thus possible without using lattice data out of L*a*b* color space, which provides effects similar to those of the first embodiment.

Although the number of interpolation processing units is two in this modification, three or more interpolation processing units 220, 230, . . . may be employed in parallel to select one of data output from these processing units respectively.

Accordingly, for a region of the color space in the inverse-pyramid shape as indicated by (e) of FIG. 6, inverse triangular pyramid interpolation is employed using five lattice points, for a region of the color space as indicated by (d), triangular prism interpolation is performed using six lattice points, and for a region of the color space as indicated by (b), 8-point interpolation is performed with a high interpolation precision, for example.

Precision in interpolation processing can thus be enhanced for the entire color space.

Second Embodiment

Figure 8:
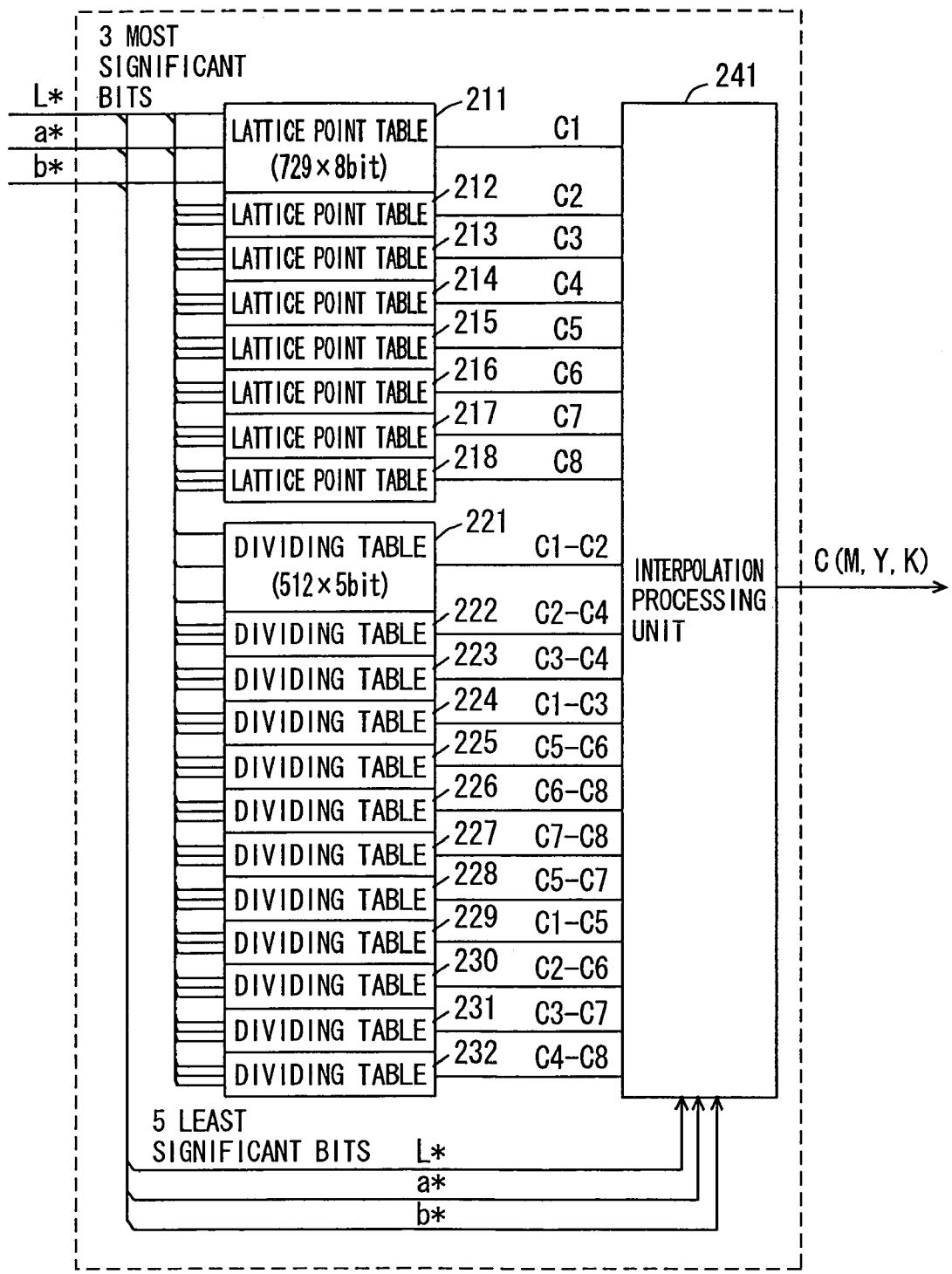
FIG. 8 is a block diagram showing a structure of a direct mapping unit 104C according to a second embodiment.

FIG. 8 is a block diagram showing a structure of a direct mapping unit 104C of an image processing apparatus according to a second embodiment. It is noted that the whole structure of the image processing apparatus of the second embodiment and that shown in FIG. 1 are the same, description thereof is not repeated here.

Referring to FIG. 8, direct mapping unit 104C includes lattice point tables 211–218 according to three most significant bits of L*a*b* data to output data of lattice points of a lattice component including the input data, dividing tables 221–232 recording a distance between lattice points (or position of a lattice point in the color space), and an interpolation processing unit 241 performing interpolation processing based on data C1–C8 from lattice point tables 211–218 respectively, data from respective dividing tables 221–232 and five least significant bits of L*a*b* data.

When a lattice component containing input data is like that shown in FIG. 4, dividing tables 221–232 respectively store respective distances between lattice points C1 and C2, between C2 and C4, between C3 and C4, between C1 and C3, between C5 and C6, between C6 and C8, between C7 and C8, between C5 and C7, between C1 and C5, between C2 and C6, between C3 and C7 and between C4 and C8.

Figure 9:
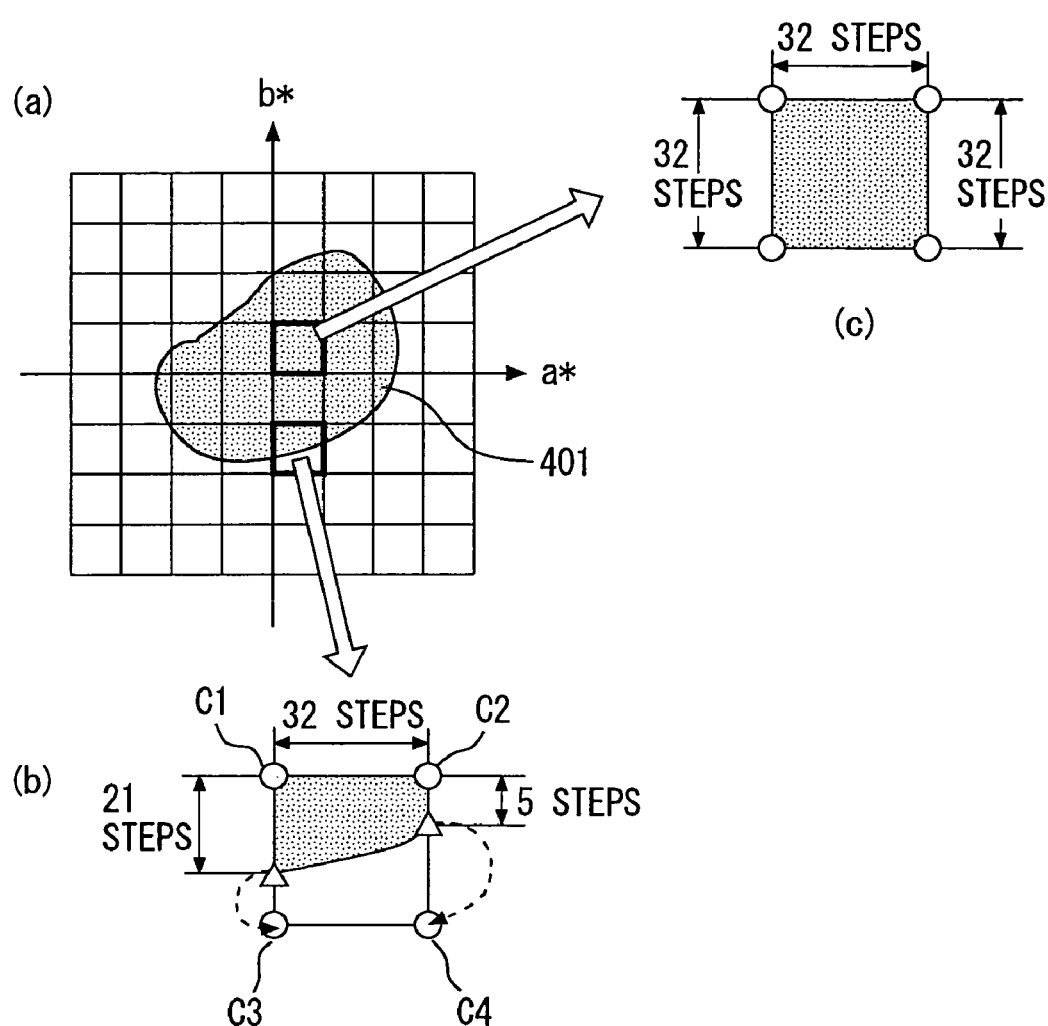
FIG. 9 illustrates processing according to the second embodiment.
Figure 10:
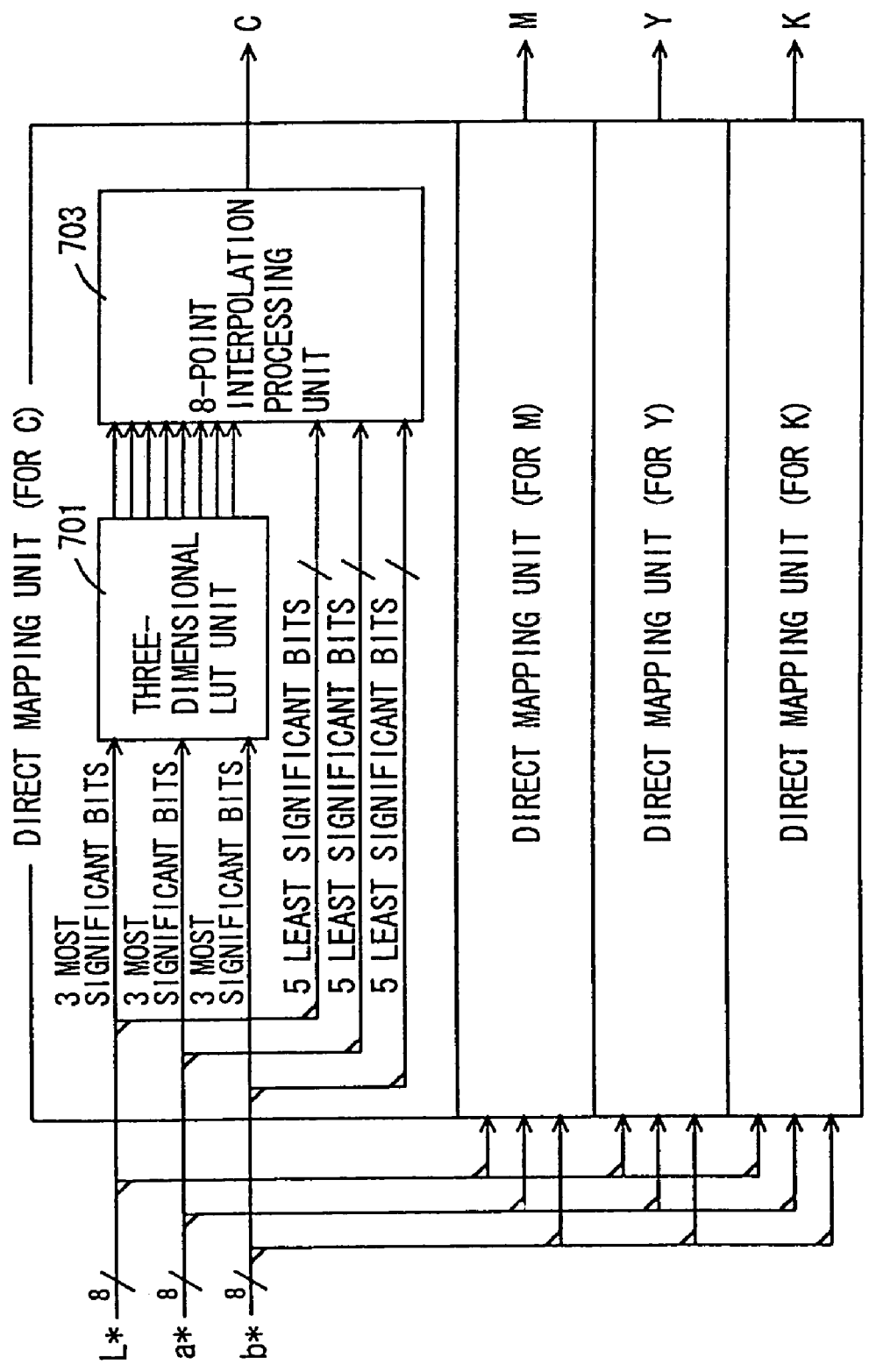
FIG. 10 is a schematic block diagram illustrating a conventional color conversion through direct mapping method.
Figure 11:
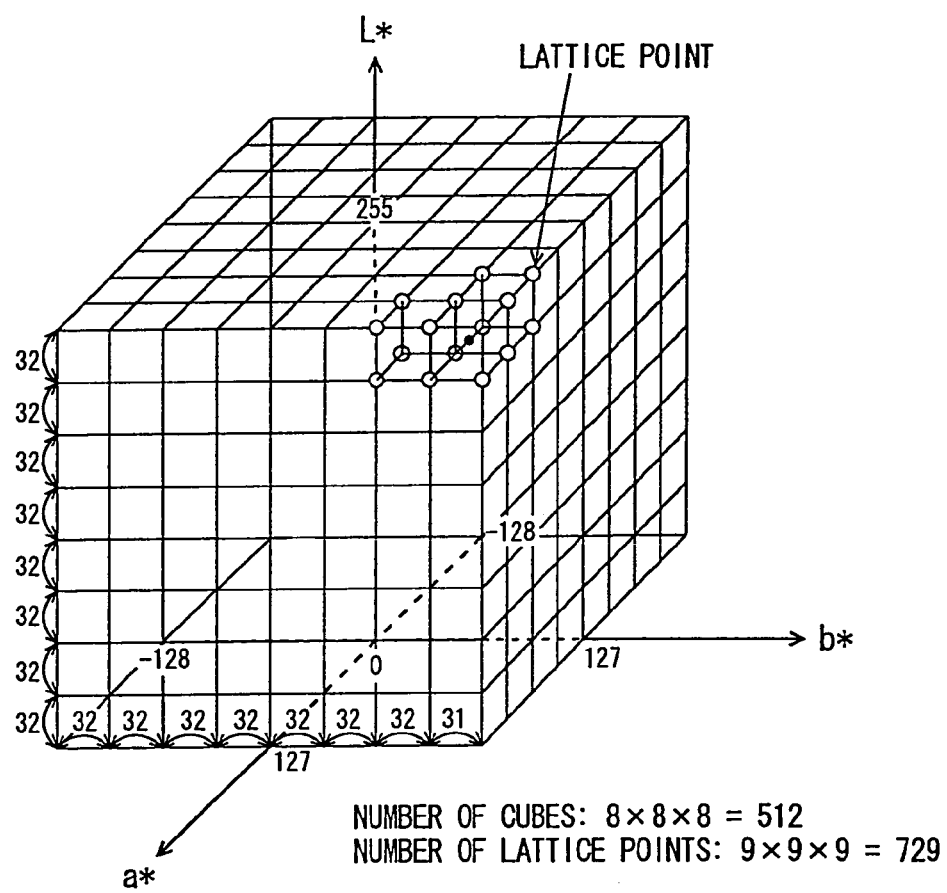
FIG. 11 illustrates a three-dimensional LUT.
Figure 14:
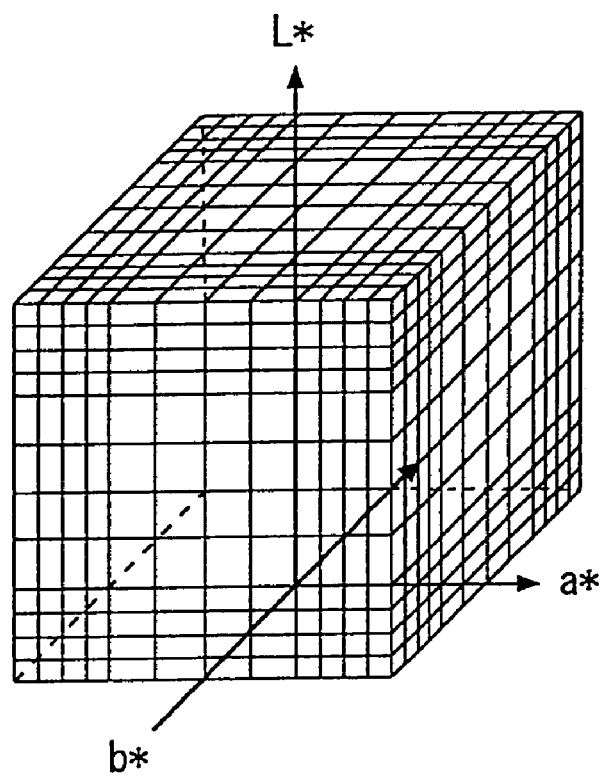
FIG. 14 illustrates an improvement of the conventional method.
Figure 15:
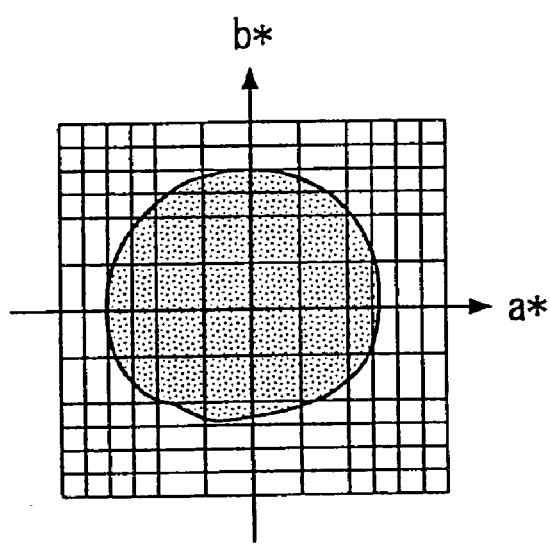
FIGS. 15–17 illustrate a problem of the method shown in FIG. 14.
Figure 16:
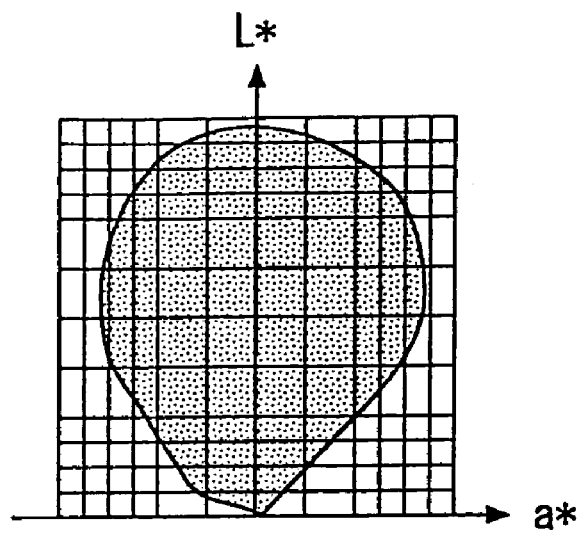
Figure 17:
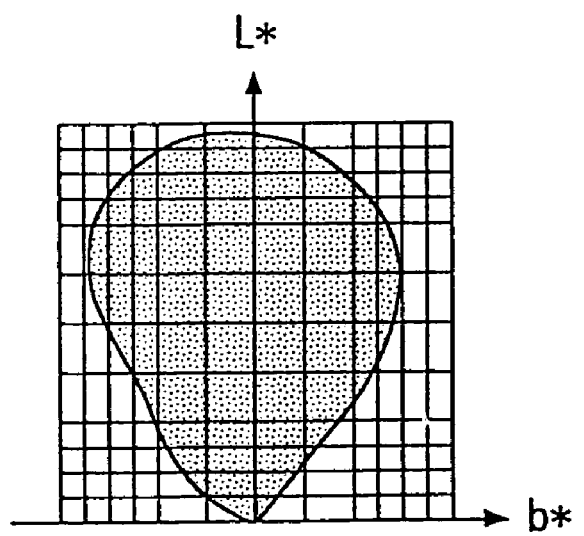

FIG. 9 illustrates interpolation processing of the second embodiment. In FIG. 9, (a) shows a*b* plane of the entire color space viewed in the direction of L* axis. The actual L*a*b* color space is spherical in shape as indicated by reference numeral 401. It is supposed here that input data is contained in the lattice component indicated by (c). All the eight lattice points exist within color space 401 as shown by (c), and the distance between lattice points is recorded as 32 steps (see FIG. 11). However, for the lattice component shown by (b), if the dimension of one side thereof is recorded as 32 steps, the lattice points are partially located outside color space 401.

In order to avoid use of data of lattice points existing outside the color space, according to the second embodiment, positions of the lattice points are equivalently shifted as indicated by (b) to constitute a resultant outermost boundary of the color space. Information on the distance between the lattice points is recorded in dividing tables 221–232 to improve precision of interpolation processing.

Specifically, for the lattice component shown by (b), lattice point data of the location at a distance of 32 steps outwardly separated from lattice point C1 in the color space is not determined. Instead, lattice point data of the location at a distance of 21 steps away from C1 is used and the determined data is recorded in any lattice point table as data of C3. Further, the distance between lattice points C1 and C3 is recorded in any dividing table to achieve an accurate interpolation processing. Similarly, lattice point data of the location 5 steps away from lattice point C2 is recorded as data of lattice point C4 and simultaneously the data on distance, 5 steps, is recorded in any dividing table.

According to the second embodiment, the distance between lattice points is stored in the dividing tables, and the distance information and lattice point data are used to perform interpolation processing thereby enhance precision in color conversion.

If lattice point tables are employed as a hardware structure that correspond to lattice points separated uniformly at even intervals and data of different step sizes as discussed above is stored in these tables, errors occur in interpolation processing which deteriorate accuracy in conversion. It could be possible to set in advance finer step sizes between lattice points for the entire space. However, the increased number of lattice points raises cost in terms of hardware. On the other hand, the second embodiment stores the distance between lattice points in the dividing tables and this distance is referred to when interpolation processing is performed. Then, the memory cost can be saved as a whole and simultaneously operational precision is enhanced.

Although three most significant bits of L*a*b* data are used to determine a lattice component and five least significant bits are used to perform interpolation processing in the embodiments above, the number of bits is variable depending on situations.

Further, in the first embodiment, a plurality of interpolation processing units are provided and any of respective outputs is selected by a selector in a hardware manner in terms of fast processing. However, software processing may be employed if a slow processing is acceptable.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A color conversion apparatus comprising:
  a color conversion table for receiving input image data represented by a first color space to output color-converted data represented by a second color space, said color-converted data corresponding to lattice points of a lattice component containing the input image data in said first color space;
  interpolation processing means for performing interpolation processing using the color-converted data output from said color conversion table; and
  a switching unit for changing lattice points corresponding to the color-converted data to be used by said interpolation processing means, according to position of said input image data in said first color space.

2. The color conversion apparatus according to claim 1, wherein
said switching unit changes the number of lattice points corresponding to the color-converted data to be used by said interpolation processing means according to position of said input image data in said first color space.

3. The color conversion apparatus according to claim 2, wherein
said switching unit selects, when all of the lattice points of the lattice component containing said input image data are included in said first color space, all of the lattice points as lattice points corresponding to the color-converted data to be used by said interpolation processing means, and selects, when only a part of the lattice points of the lattice component containing said input image data is included in said first color space, a predetermined number of lattice points included in said first color space as lattice points corresponding to the color-converted data to be used by said interpolation processing means.

4. A color conversion method comprising:
receiving input image data represented by a first color space to output color-converted data represented by a second color space, said color-converted data corresponding to lattice points of a lattice component containing said input image data in said first color space;
performing interpolation processing using said output color-converted data; and
changing lattice points of the lattice component containing the input image data being converted corresponding to the color-converted data to be used in said interpolation processing, according to position of said input image data in said first color space.

5. The color conversion method according to claim 4, wherein
said changing step changes the number of lattice points corresponding to the color-converted data to be used in said interpolation processing according to position of said input image data in said first color space.

6. The color conversion method according to claim 5, wherein
said changing step selects, when all of the lattice points of the lattice component containing said input image data are included in said first color space, all of the lattice points as lattice points corresponding to the color-converted data to be used in said interpolation processing, and selects, when only a part of the lattice points of the lattice component containing said input image data is included in said first color space, a predetermined number of lattice points included in said first color space as lattice points corresponding to the color-converted data to be used in said interpolation processing.

7. A color conversion apparatus comprising:
a color conversion table for receiving input image data represented by a first color space to output color-converted data represented by a second color space, said color-converted data corresponding to lattice points of a lattice component containing the input image data in said first color space;
a first interpolation processing unit for performing interpolation processing using color-converted data output from said color conversion table;
a second interpolation processing unit for performing interpolation processing using color-converted data corresponding to lattice points different from those used by said first interpolation processing unit; and
a switching unit for making a switch between said first interpolation processing unit and said second interpolation processing unit, according to position of said input image data in said first color space.

8. The color conversion apparatus according to claim 7, wherein
said switching unit selects said first interpolation processing unit when all of the lattice points of the lattice component containing said input image data are included in said first color space and selects said second interpolation processing unit when only a part of the lattice points of the lattice component containing said input image data is included in said first color space.

9. The color conversion apparatus according to claim 8, wherein
the number of lattice points corresponding to the color-converted data to be used by said second interpolation processing unit is smaller than that to be used by said first interpolation processing unit.

10. The color conversion apparatus according to claim 8, further comprising a selection unit for selecting lattice points corresponding to the color-converted data to be used by said second interpolation processing unit.

11. The color conversion apparatus according to claim 10, wherein
said selection unit selects a predetermined number of lattice points included in said first color space.

12. A color conversion apparatus comprising:
a color conversion table for receiving input image data represented by a first color space to output color-converted data represented by a second color space, said color-converted data corresponding to lattice points of a lattice component containing the input image data in said first color space;
a storage unit for storing distance information indicating distance between said lattice points; and
an interpolation processing unit for performing interpolation processing using the color-converted data output from said color conversion table and the distance information stored in said storage unit, wherein
the distance between lattice points stored in said storage unit is smaller in boundary region of said first color space than in remaining region of said first color space.

13. A color conversion method comprising the steps of:
receiving input image data represented by a first color space to output color-converted data represented by a second color space, said color-converted data corresponding to lattice points of a lattice component containing said input image data in said first color space; and
performing interpolation processing using said output color-converted data and distance information indicating distance between said lattice points, wherein
the distance between lattice points stored in said storage unit is smaller in boundary region of said first color space than in remaining region of said first color space.

* * * * *